March 4, 1941.  L. C. STRITE  2,233,684
FISH LURE
Filed Nov 30, 1938

Inventor
L. C. Strite
By his Attorneys
Michael Michael

Patented Mar. 4, 1941

2,233,684

UNITED STATES PATENT OFFICE 2,233,684

FISH LURE

Lloyd C. Strite, Chicago, Ill.

Application November 30, 1938, Serial No. 243,143

1 Claim. (Cl. 43—46)

My present invention provides an improved fish lure or bait and generally stated consists of the novel devices, combination of devices and arrangement of parts hereinafter described and defined in the claims.

More specifically stated the improved lure is an articulated device made up of major and minor sections, the major section at its front end having a recess into which the rear end of the minor section is telescoped, and is therein anchored with freedom for relative wobbling movements of the sections.

Both of the sections are made in general form and are preferably more or less decorated or marked to simulate fish bodies. The general appearance of the complete lure is very much that of a large fish attempting to swallow a smaller fish. The invention also involves certain other minor features as will more fully appear.

In the accompanying drawing which illustrates a commercial form of the improved lure, like characters indicate like parts throughout the several views.

Referring to the drawing.

Figure 1:
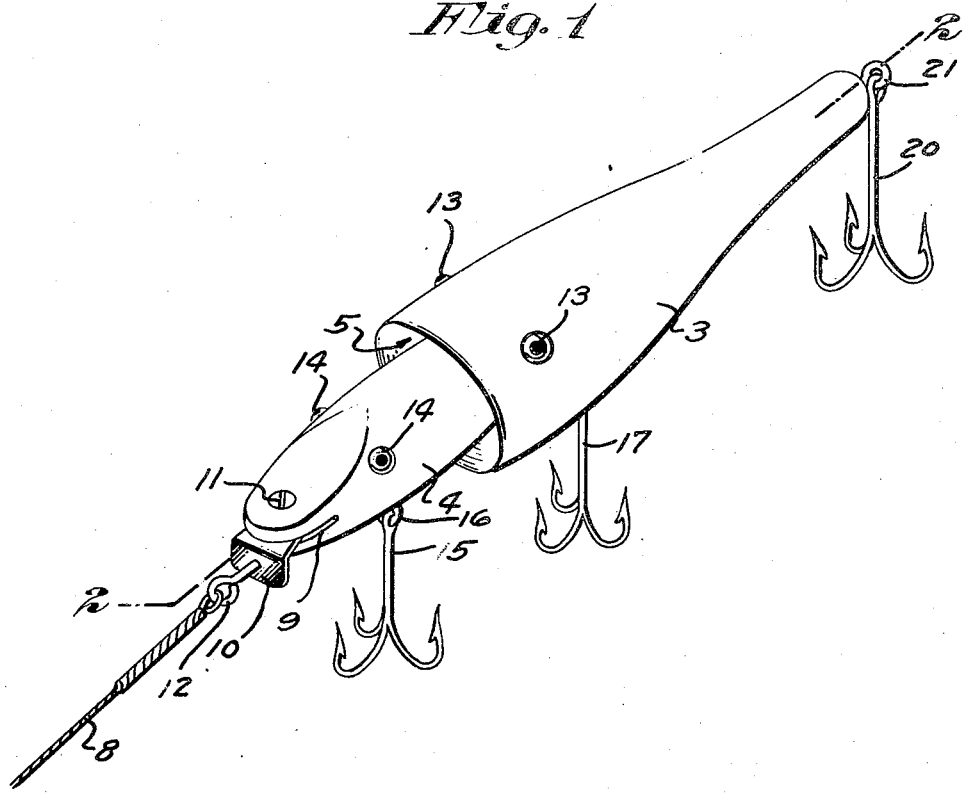
Fig. 1 is a perspective showing the complete fish lure.
Figure 2:
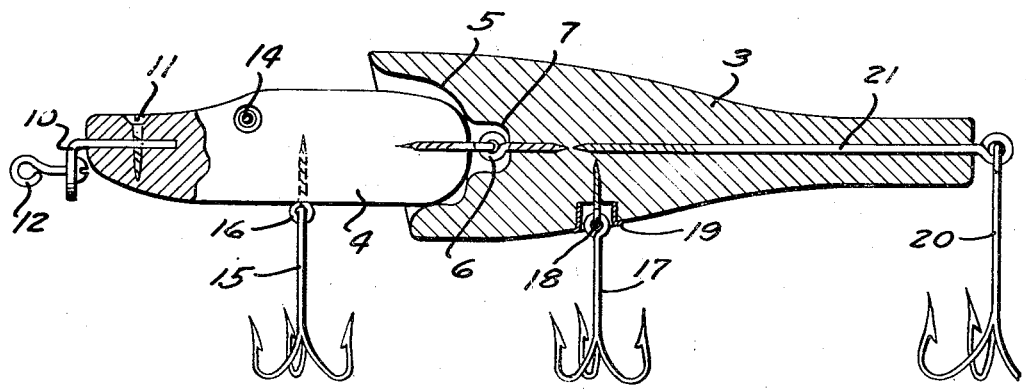
Fig. 2 is an axial section approximately on the line 2—2 of Fig. 1, some parts being in full side elevation.

The major or main section is indicated by the character 3 and the minor or supplemental section is indicated by the numeral 4. The major section 3, at its front end, is formed with a quite deep cup-shaped recess 5 into which the rounded rear end of the minor section 4 is telescoped or projected, and as stated, is therein anchored for wobbling movements.

As an extremely simple and highly efficient means for anchoring the section 4 within the recess of the section 3, I preferably employ interlooped screw eyes 6, the threaded stems of which are screwed into the bodies of the two sections with the heads of the screw eyes within the counter-sunk axial bore or pocket 7 formed as an extension of the main recess 5.

The bodies of the sections 3 and 4 may be made of various different materials, but usually and preferably will be made of wood or suitable plastic substance.

At its front end or nose, the minor section 4 is provided with means for attachment to a fish line 8, and preferably and as shown in the drawing, this is effectively accomplished by providing the nose of the section 4 with a mouth-like slit 9 into which is inserted a flat L-shaped metallic clip 10 held in place by a screw 11 or the like, which is inserted through the nose of said section 4 and through the blade of the clip 10.

The line or leader 8 is shown as directly applied to a small eyelet 12 that is swivelled to the depending flange of the clip 10. For closer imitation of the fish bodies, the sections 3 and 4, as shown, are respectively provided with artificial eyes 13 and 14.

Hooks are preferably applied to both of the sections 3 and 4, and preferably these are arranged as follows: A hook 15 depends from and is connected to the bottom of section 4 by means of a screw eye 16; a hook 17 is attached to the bottom of the body member 3 by a screw eye 18, the head of which is within a bushing 19 inserted into the body of said member; and a third hook 20 is applied to the eye of a long screw eye or bolt 21 that is inserted axially through the body 3 at the rear end thereof.

As evident, the three hooks are applied so that they depend from the lower part of the members and tend to keep the same right side up, that is, with the eyes on the top or upper portion of the lure when the latter is pulled through the water. Of course, there will be a wobbling and zig-zagging movement of the bait as it is pulled through the water, and such movements are desirable. In addition to the general wobbling movement, there will be a wobbling or gyrating movement between the two sections of the lure. The wobbling or gyrating movement of the section 4 in respect to the section 3 will be limited by the walls of the recess 5. The interlooped screw eyes 6 permit all of the desired wobbling movement of the two sections, the one in respect to the other, but the said interlooped eyelets prevent axial rotation of the one section in respect to the other, and hence keep the eyes of the two sections extended in the same general upward direction. Of course, it would be very undesirable to permit the two sections to rotate so that the eyes of the one section would be upward while the eyes of the other section were downward.

In the action of the lure in the water there is produced a very close imitation of a small fish partly swallowed by a larger fish and attempting to get loose. Not only is the recessed end of the major or rear section 3 of greater diameter than the rear end of the minor section 4, but recess 5 has such clearance from the rear end of the front section that it acts as a cup to receive water, and the water thus caused to eddy within the recess 5 but materially modifies the wobbling action of the bait.

As stated, the wobbling motion is limited by the walls of the cup-like recess 5. The rush of water into the recess 5 tends to accelerate the wobbling movement of the two sections and their advance through the water. Of course, the bait can be made in various different sizes, depending upon the type of fish that is expected to be caught in the bait.

When the sections are made of wood or any other water absorbing material, they will preferably be covered with a coat of paint or other waterproof coating.

What I claim is:

An artificial fish lure involving major and minor sections, said major section, at its front end, having a cup-shaped recess that has such clearance from the rear end of the minor section that it forms a cup that will receive water and cause it to eddy within the cup and thereby modify the movements of the bait, said minor section being of less diameter than said major section and having its rear end extended into said recess with such clearance from the surrounding wall of said recess as to permit relative wobbling movements of said sections, and means anchoring the rear end of said minor to said major section, at the bottom of said recess, with freedom for such wobbling movements.

LLOYD C. STRITE.